(12) United States Patent
Yi

(10) Patent No.: US 8,588,549 B2
(45) Date of Patent: Nov. 19, 2013

(54) IMAGE FORMING APPARATUS AND DE-SKEW METHOD THEREOF

(75) Inventor: Jong-hyon Yi, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 718 days.

(21) Appl. No.: 12/659,810

(22) Filed: Mar. 22, 2010

(65) Prior Publication Data

US 2011/0085186 A1 Apr. 14, 2011

(30) Foreign Application Priority Data

Oct. 14, 2009 (KR) .......................... 20009-0097747

(51) Int. Cl.
*G06K 9/36* (2006.01)
(52) U.S. Cl.
USPC ........... 382/289; 382/151; 382/296; 382/112; 358/448; 358/449
(58) Field of Classification Search
USPC ................... 382/112, 151, 296; 358/448, 449
See application file for complete search history.

(56) References Cited

U.S. PATENT DOCUMENTS

| 5,054,098 A * | 10/1991 | Lee ............................... 382/289 |
| 5,506,918 A * | 4/1996 | Ishitani ......................... 382/289 |
| 2005/0238205 A1* | 10/2005 | Kimura et al. ................. 382/112 |
| 2012/0262750 A1* | 10/2012 | Kinoshita et al. ............ 358/1.14 |

FOREIGN PATENT DOCUMENTS

JP 2004-106289 4/2004

* cited by examiner

*Primary Examiner* — Chan S Park
*Assistant Examiner* — Mark Roz
(74) *Attorney, Agent, or Firm* — Staas & Halsey LLP

(57) ABSTRACT

A de-skew method of an image forming apparatus is provided which includes reading an image on a print medium fed through an automatic document feeder (ADF); detecting a leading edge of the print medium and calculating a skew angle of the read image; comparing the calculated skew angle to a first threshold and determining whether to perform a de-skew operation; and setting skew compensation levels based on the calculated skew angle and performing different de-skew operations according to the set skew compensation levels to output a de-skewed image when the absolute value of the calculated skew angle is equal to or greater than the first threshold.

14 Claims, 7 Drawing Sheets

IMAGE FORMING APPARATUS AND DE-SKEW METHOD THEREOF

CROSS-REFERENCE TO RELATED APPLICATIONS

This application claims the benefit of Korean Patent Application No. 10-2009-0097747, filed Oct. 14, 2009, in the Korean Intellectual Property Office, the disclosure of which is incorporated herein by reference.

BACKGROUND

1. Field

Aspects of the present invention relate to an image forming apparatus and a de-skew method thereof. More particularly, aspects of the present embodiment relate to an image forming apparatus to compensate for a skew in a print medium fed through an automatic document feeder (ADF), and a de-skew method of the image forming apparatus.

2. Description of the Related Art

Image forming apparatuses function to generate, print, receive and transmit image data, and may include, for example, printers, scanners, copiers, fax machines, and multifunctional peripherals (MFP) combining operations of one or more of those devices.

In particular, an image forming apparatus including an ADF can prevent a skew in documents using physical guides. However, due to a difference in diameter and in frictional force of left and right rollers of the ADF, documents may be skewed while being transferred.

When the ADF is used to scan or copy a document, the skewed document is scanned or copied, and accordingly users may feel inconveniences.

Therefore, there is a need for a method to compensate for skew caused by the use of the ADF during scanning.

SUMMARY

Aspects of the present embodiment provide an image forming apparatus to perform various deskew processes according to skew levels, and a deskew method of the image forming apparatus.

Additional aspects and/or advantages will be set forth in part in the description which follows and, in part, will be obvious from the description, or may be learned by practice of the invention.

The foregoing and/or other aspects are achieved by providing a de-skew method of an image forming apparatus, the de-skew method including: reading an image on a print medium fed through an automatic document feeder (ADF); detecting a leading edge of the print medium and calculating a skew angle of the read image; comparing the calculated skew angle to a first threshold; and setting skew compensation levels based on the calculated skew angle and performing different de-skew operations according to the set skew compensation levels to output a de-skewed image when an absolute value of the calculated skew angle is equal to or greater than the first threshold.

The de-skew method further includes outputting the image without performing the de-skew operation when the absolute value of the calculated skew angle is less than the first threshold.

The calculating of the skew angle may include: individually sampling pixels arranged in a same array column at preset intervals; detecting a plurality of transition points using the sampled pixels; removing an outlier from among the plurality of detected transition points; performing a linear regression on the transition points remaining after removal of the outlier; and calculating the skew angle of the read image according to the linear regression.

The detecting of the plurality of transition points may include checking whether a difference in brightness between neighboring pixels in a same array column among the sampled pixels is equal to or greater than a first reference value; and detecting one of the neighboring pixels as a transition point when the difference in brightness between the neighboring pixels is equal to or greater than the first reference value.

The calculating of the skew angle may further include storing the plurality of detected transition points.

The removing of the outlier may include extracting a transition point in which a row interval between neighboring pixels is equal to or greater than a second reference value from the plurality of detected transition points.

The de-skew method may further include removing a top skip using the calculated skew angle.

The outputting of the de-skewed image may include de-skewing the image using a second threshold to output a de-skewed image when the absolute value of the calculated skew angle exceeds the second threshold, and de-skewing the image using an intermediate value between the first threshold and the second threshold to output a de-skewed image when the absolute value of the calculated skew angle is the intermediate value.

The de-skew method may further include receiving an input of a user command to set the first threshold.

The foregoing and/or other aspects are achieved by providing an image forming apparatus, including: a read unit to read an image on a print medium fed through an automatic document feeder (ADF); a calculation unit to detect a leading edge of the print medium and to calculate a skew angle of the read image; a determination unit to compare the calculated skew angle to a first threshold and to determine whether to perform a de-skew operation; and an output unit to set skew compensation levels based on the calculated skew angle and to perform different de-skew operations according to the set skew compensation levels to output a de-skewed image when an absolute value of the calculated skew angle is equal to or greater than the first threshold.

The output unit may output the image without performing the de-skew operation when the absolute value of the calculated skew angle is less than the first threshold.

The calculation unit may include a sampling unit to individually sample pixels arranged in a same array column at preset intervals; a detection unit to detect a plurality of transition points using the sampled pixels; a removal unit to remove an outlier from among the plurality of detected transition points; a linear regression unit to perform a linear regression on the transition points remaining after removal of the outlier; and a skew angle calculation unit to calculate the skew angle of the read image according to the linear regression.

The detection unit may check whether a difference in brightness between neighboring pixels in a same array column among the sampled pixels is equal to or greater than a first reference value, and detects one of the neighboring pixels as a transition point when the difference in brightness between the neighboring pixels is equal to or greater than the first reference value.

The calculation unit may further include a storage unit to store the plurality of detected transition points.

The removal unit may extract a transition point in which a row interval between neighboring pixels is equal to or greater than a second reference value from the plurality of detected transition points.

The output unit may remove a top skip using the calculated skew angle, and output an image from which the top skip is removed.

The output unit may de-skew the image using a second threshold to output a de-skewed image when an absolute value of the calculated skew angle exceeds the second threshold, and the output unit de-skews the image using an intermediate value between the first threshold and the second threshold to output a de-skewed image when the absolute value of the calculated skew angle is the intermediate value.

The image forming apparatus according to claim 10, may further include a user interface (UI) to receive an input of a user command to set the first threshold.

BRIEF DESCRIPTION OF THE DRAWINGS

These and/or other aspects and advantages will become apparent and more readily appreciated from the following description of the embodiment, taken in conjunction with the accompanying drawings of which.

DETAILED DESCRIPTION

Figure 1:
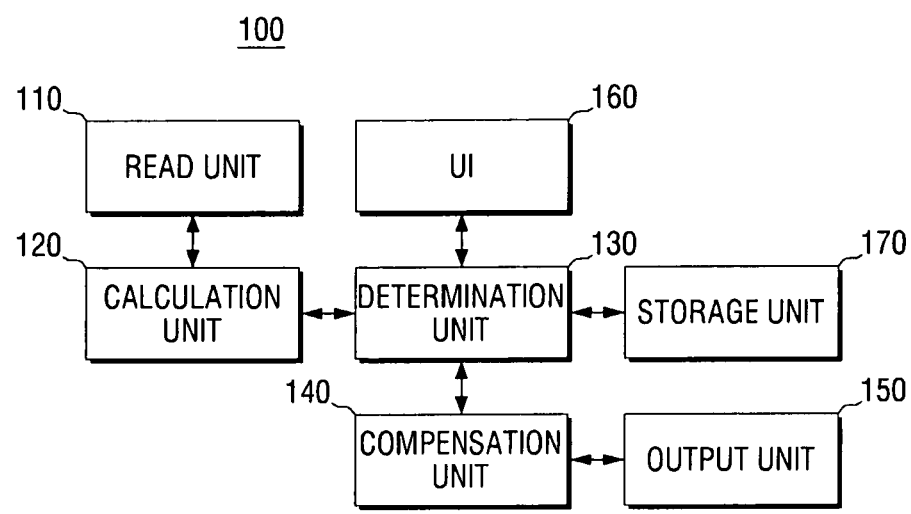
FIG. 1 is a block diagram illustrating an image forming apparatus according to an exemplary embodiment.

Reference will now be made in detail to the present embodiment, examples of which are illustrated in the accompanying drawings, wherein like reference numerals refer to like elements throughout. At least one embodiment is described below in order to explain the aspects of the present invention by referring to the figures.

FIG. 1 is a block diagram illustrating an image forming apparatus 100 according to an exemplary embodiment. Referring to FIG. 1, the image forming apparatus 100 includes a read unit 110, a calculation unit 120, a determination unit 130, a compensation unit 140, an output unit 150, a user interface (UI) 160 and a storage unit 170.

The read unit 110 reads an image on a print medium fed through an automatic document feeder (ADF). The print medium contains a scanned image, and pixels of the scanned image have a difference in brightness, namely gradation.

The read unit 110 includes an image sensor and a white board (or a white bar). If a print sheet of paper is fed first from the image forming apparatus 100 in response to a command, such as a scan command, the image sensor of the read unit 110 reads a difference in brightness between a blank space outside the print medium and edges of the print medium, while detecting the white board. Accordingly, the read unit 110 may determine whether a skew occurs due to misalignment of the print medium.

The calculation unit 120 calculates a skew angle according to the occurrence or non-occurrence of skew determined by the read unit 110. In more detail, the calculation unit 120 detects a leading edge of the print medium, and calculates a skew angle of the read image. The operation of the calculation unit 120 will be described in detail with reference to the accompanying drawings.

The determination unit 130 compares the calculated skew angle to a first threshold, and determines whether to perform a de-skew process. The calculated skew angle may be an angle obtained when the print medium is inclined to the left or an angle obtained when the print medium is inclined to the right. If one of the two angles is set as a positive skew angle, the other angle may be set as a negative skew angle.

If an absolute value of the skew angle is less than the first threshold (that is, if the skew barely occurs to the left or the right), it may be desirable to print a document without the need to perform the de-skew process.

The first threshold may be previously set and stored, or may be optionally changed by a user.

If the determination unit 130 determines that the de-skew process is required, the compensation unit 140 sets the skew compensation levels based on the calculated skew angles, and performs different de-skew processes according to the set skew compensation levels.

In more detail, if an absolute value of the calculated skew angle exceeds a second threshold, the compensation unit 140 may compensate for the skew using the second threshold. Alternatively, if the absolute value of the calculated skew angle is a predetermined value in the range of the first threshold to the second threshold, for example, an intermediate value, the compensation unit 140 may compensate for the skew using the intermediate value.

The compensation unit 140 removes a top skip using the calculated skew angle.

The output unit 150 outputs a de-skewed image. Alternatively, if the absolute value of the calculated skew angle is less than the first threshold, there is no need to perform the de-skew process, and thus the output unit 150 may output the read image only.

According to another exemplary embodiment, the output unit 150 may include the compensation unit 140. In this situation, if the determination unit 130 determines that the absolute value of the calculated skew angle is less than the first threshold, the output unit 150 may output the read image without the need to perform any de-skew process. If the determination unit 130 determines that the absolute value of the calculated skew angle is greater than or equal to the first threshold, the output unit 150 may set skew compensation levels based on the calculated skew angle, and may perform different de-skew processes according to the set skew compensation levels, so as to output a de-skewed image.

Additionally, the output unit 150 may remove a top skip using the calculated skew angle, and may then output an image from which the top skip is removed.

Furthermore, if the absolute value of the calculated skew angle exceeds the second threshold, the output unit 150 may compensate for the skew using the second threshold. Alternatively, if the absolute value of the calculated skew angle is an intermediate value between the first threshold and the second threshold, the output unit 150 may compensate for the skew using the intermediate value and may then output a de-skewed image.

The UI 160 may receive a user command input by a user to set the first threshold or the second threshold using an operating panel.

The storage unit 170 may store a variety of information required for the de-skew process along with the first threshold, the second threshold, a first reference value, a second reference value and coordinate values for transition points.

The image forming apparatus 100 may desirably perform not only the de-skew process described above, but also a scanning operation or copying operation. Additionally, the image forming apparatus 100 may feed print media through the ADF, and may desirably be implemented as a multifunctional peripherals (MFP) combining a scanner, a copier or at least one of them.

Therefore, the image forming apparatus 100 according to the exemplary embodiment can exactly compute skew levels and perform de-skewing selectively according to the skew levels. Accordingly, it is possible to address a problem of memory limitation in a processor caused by an increase in the skew levels when an image processing pipeline is used.

Figure 2:
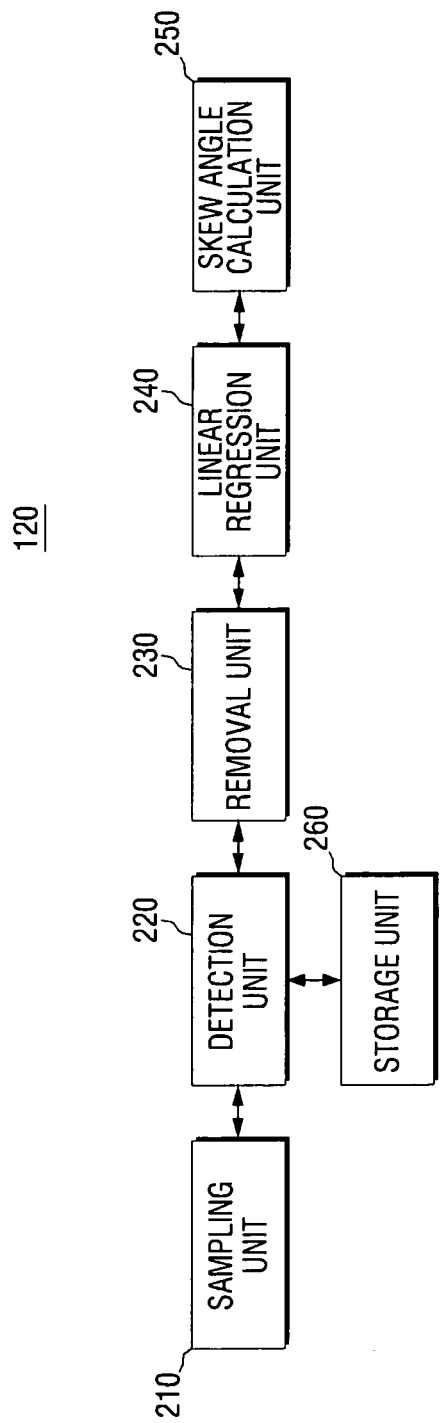
FIG. 2 is a block diagram illustrating an example of a calculation unit of the image forming apparatus illustrated in FIG. 1.

FIG. 2 is a block diagram illustrating an example of the calculation unit 120 of the image forming apparatus 100. Referring to FIG. 2, the calculation unit 120 includes a sampling unit 210, a detection unit 220, a removal unit 230, a linear regression unit 240, and a skew angle calculation unit 250.

The sampling unit 210 individually samples pixels arranged in the same array column at preset intervals.

The detection unit 220 detects a plurality of transition points using the sampled pixels.

In more detail, the detection unit 220 checks whether a difference in brightness between neighboring pixels in the same array column among the sampled pixels is greater than a first reference value, and if so, detects one of the neighboring pixels as a transition point. In this situation, the detected transition point may be stored in a storage unit 260.

The removal unit 230 removes an outlier from the plurality of detected transition points.

More specifically, the removal unit 230 determines, as an outlier, a transition point in which a row interval between neighboring pixels is greater than a second reference value among the plurality of detected transition points, and then extracts the outlier from the plurality of detected transition points.

The linear regression unit 240 performs linear regression on the transition points remaining after removal of the outlier.

The skew angle calculation unit 250 calculates the skew angle of the read image according to the linear regression.

Hereinafter, the operating principle of the image forming apparatus according to the exemplary embodiment will be described in greater detail.

Figure 3:
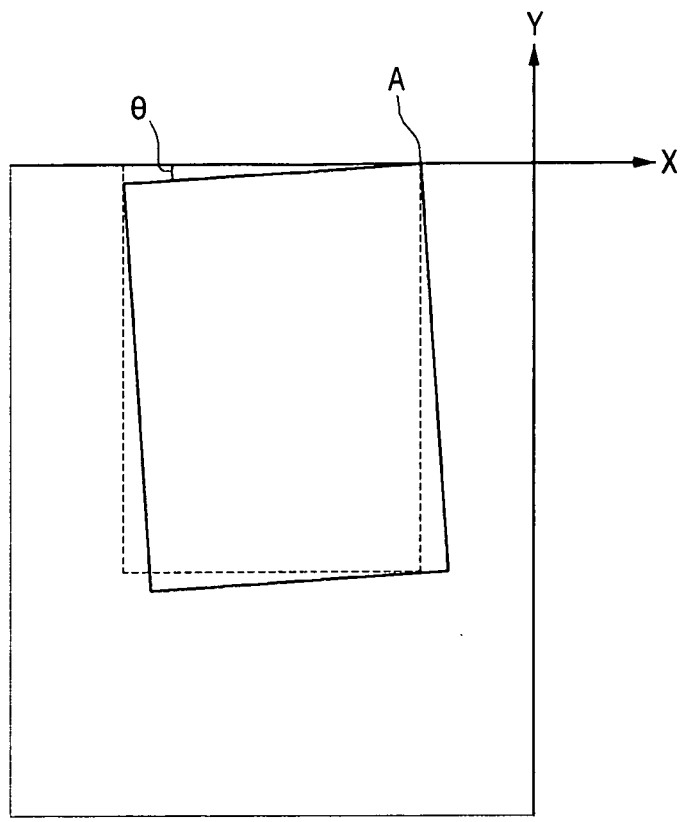
FIG. 3 is a view illustrating an example of a skewed print medium.

FIG. 3 is a view illustrating an example of a skewed print medium. Referring to FIG. 3, the print medium is skewed at an angle θ. A skew amount of the print medium skewed from its one edge A may be measured, and accordingly, the level of the skew may be determined according to the skew angle θ.

Figure 4:
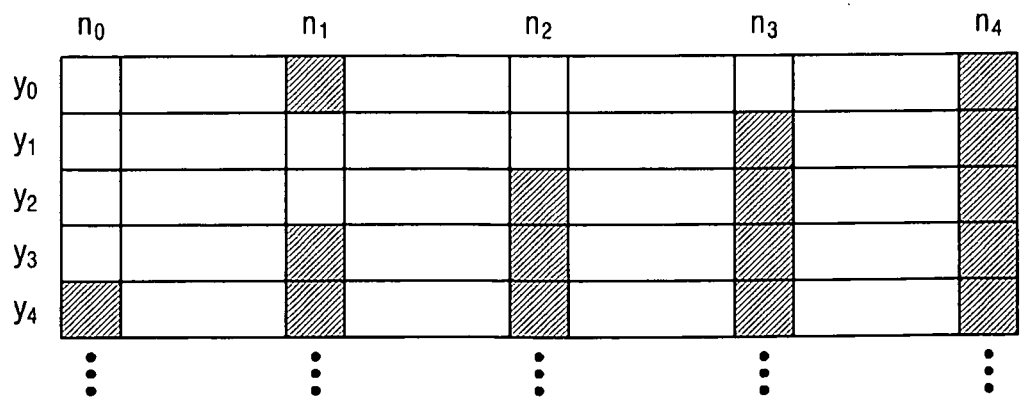
FIG. 4 is a view explaining a sampling operation performed to detect edges of a print medium according to an exemplary embodiment.

FIG. 4 is a view explaining a sampling operation performed to detect edges of a print medium according to an exemplary embodiment. Referring to FIG. 4, the sampling unit 210 samples a first group of pixels, which are arranged in the same array column and have coordinate values, for example $(n_4, y_0)$, $(n_4, y_1)$, $(n_4, y_2)$, ..., and $(n_4, y_n)$. Additionally, the sampling unit 210 samples a second group of pixels, which are arranged in the same array column and have coordinate values, for example $(n_3, y_0)$, $(n_3, y_1)$, $(n_3, y_2)$, ..., and $(n_3, y_n)$. In this situation, the pixels in the second group are spaced apart from the pixels of the first group by a predetermined distance in a row direction (namely, a horizontal scanning direction). Therefore, there is no need to check all coordinate values for pixels of the entire document.

Figure 5:
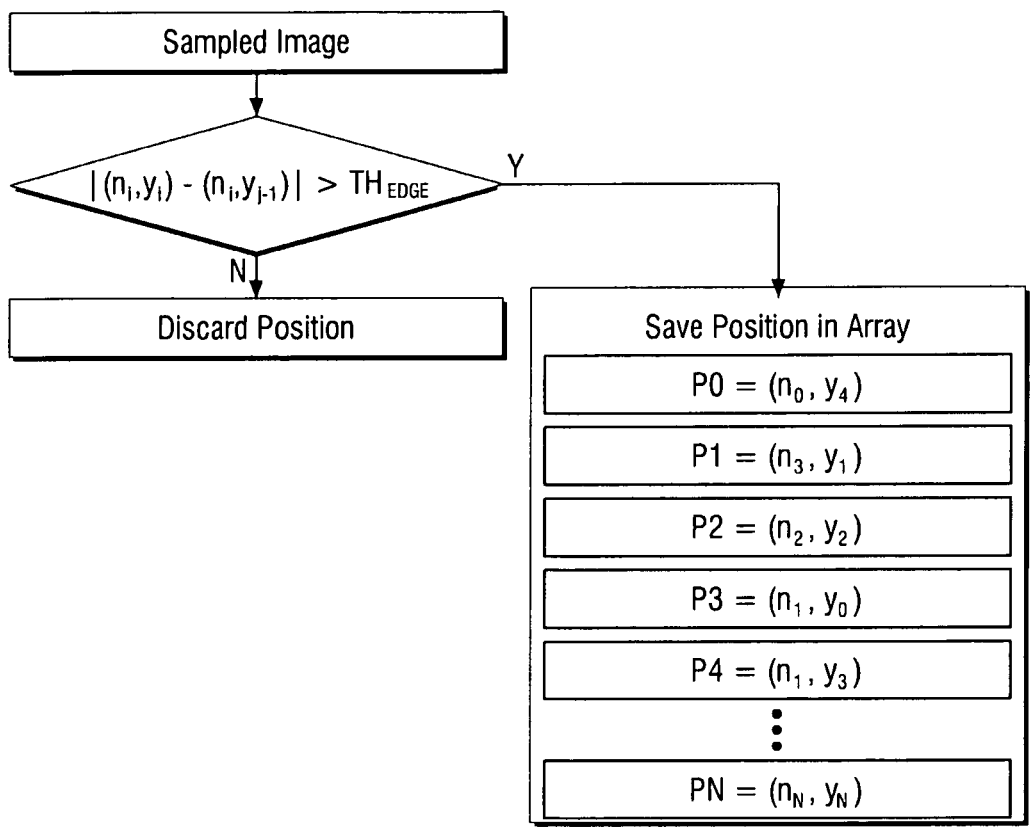
FIG. 5 is a view explaining detection of transition points according to an exemplary embodiment.

FIG. 5 is a view explaining detection of transition points according to an exemplary embodiment. Referring to FIGS. 4 and 5, the detection unit 220 checks a difference in brightness (namely, a gradation) between a top pixel with the coordinate value $(n_3, y_0)$ and its next pixel with the coordinate value $(n_3, y_1)$ among the pixels in the second group. In other words, the detection unit 220 checks the gradation between two vertically neighboring pixels. As a result, if the gradation is greater than the first reference value, the detection unit 220 may detect one of the two pixels as a transition point. Desirably, the detection unit 220 may detect the next pixel, which has coordinate value $(n_3, y_1)$ and low brightness due to its content, as a transition point.

Therefore, it is possible to detect the plurality of transition points for the pixels sampled as shown in FIG. 4, by repeating the above-described process for each group of pixels arranged in the same array column.

Herein, the plurality of detected transition points may be stored in the storage unit 260.

Figure 6:
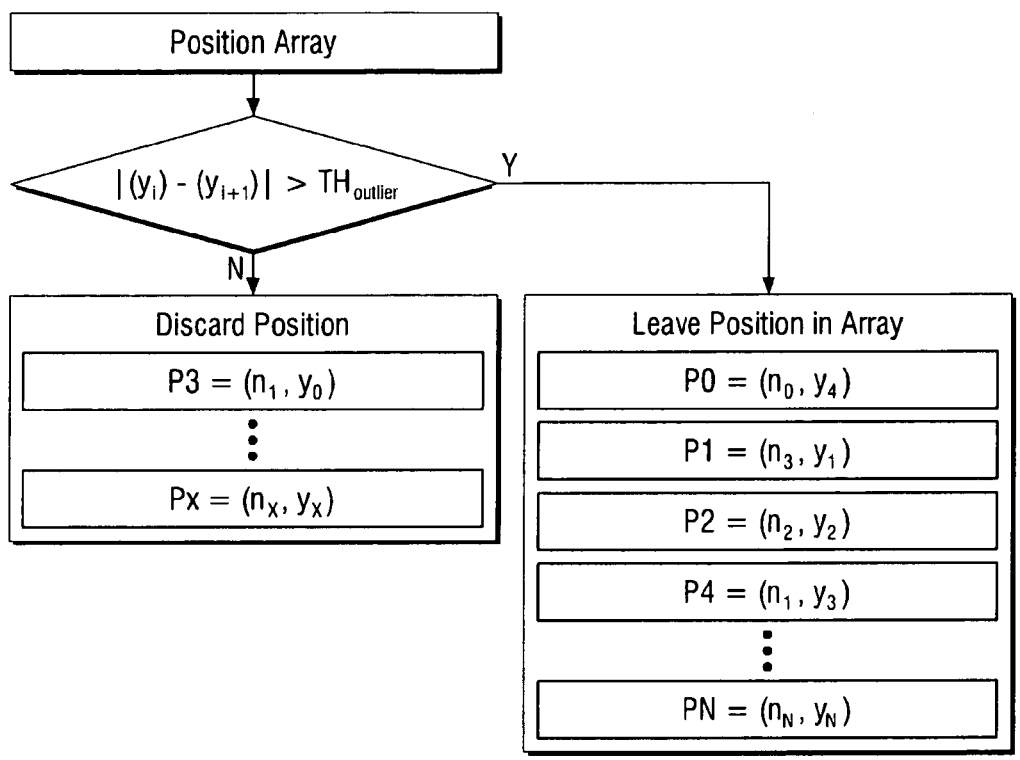
FIG. 6 is a view explaining removal of an outlier according to an exemplary embodiment.

FIG. 6 is a view explaining removal of an outlier according to an exemplary embodiment. Referring to FIGS. 4 to 6, the plurality of detected transition points is stored in the storage unit 260 in an array configuration as illustrated in FIG. 5.

However, a pixel which does not affect detection edges of the skewed print medium may be detected as a transition point, for example, a pixel with coordinate value $(n_1, y_0)$, as shown in FIG. 4.

The removal unit 230 removes an outlier, namely a pixel which does not affect detection of edges of the skewed print medium.

The outlier is a transition point in which an interval between neighboring pixels arranged in a column direction (namely, a vertical scanning direction) is greater than the second reference value. In more detail, both a row distance between the pixel with coordinate value $(n_1, y_0)$ and a pixel with coordinate value $(n_0, y_4)$ and a row distance between the pixel with coordinate value $(n_1, y_0)$ and a pixel with coordinate value $(n_1, y_3)$ are greater than the second reference value, and accordingly the removal unit 230 may determine the pixel with coordinate value $(n_1, y_0)$ as an outlier, and may remove the pixel with coordinate value $(n_1, y_0)$ from the storage unit 260.

FIGS. 4 to 6 exemplarily illustrate linear edges of the print medium for convenience of description, but, for example, even an A4 print sheet of paper includes 5000 pixels in a horizontal direction and 7000 pixels in a vertical direction. Accordingly, it is impossible to detect a transition point with a linear shape.

Accordingly, the linear regression unit 240 performs linear regression to make linear the edges of the skewed print medium which are curved and not linear.

$$a_1 \cdot X + a_2 = Y \qquad \text{[Equation 1]}$$

$$a_1 = \frac{\text{Sum}_Y \cdot \text{Sum}_X - N \cdot \text{Sum}_{XY}}{\text{Sum}_{X2} - N \cdot \text{Sum}_{X2}} \qquad \text{[Equation 2]}$$

-continued $$a_2 = \frac{Sum_X \cdot Sum_{XY} - Sum_Y \cdot Sum_X^2}{Sum_{X^2} - N \cdot Sum_{X^2}}$$ [Equation 3]

Herein, $$Sum_x = \sum_{i=1}^{N} x, Sum_y = \sum_{i=1}^{N} y, Sum_{xy} = \sum_{i=1}^{N} xy,$$

$$Sum_{x^2} = \sum_{i=1}^{N} x^2; \text{ and } N \text{ is a positive integer.}$$

When a sum of x coordinate values of the transition points remaining after the removal of outliers, a sum of y coordinate values of the remaining transition points, a sum of xy values and a sum of $x^2$ values are applied to theoretically derived Equations 2 and 3, a1 and a2 may be calculated.

When the calculated a1 and a2 are applied to Equation 1, a straight line with a slope of a1 and y-intercept of a2 may be obtained to indicate a leading edge of the skewed print medium.

Subsequently, the skew angle calculation unit 250 may calculate a skew angle using the straight line and a coordinate value ($n_4$, $y_0$) of the top leftmost pixel A of the print medium (see FIGS. 3 and 4).

The compensation unit 140 may also remove a top skip, namely an unnecessary blank space in a skewed portion of the print medium, using the above-described values.

Figure 7:
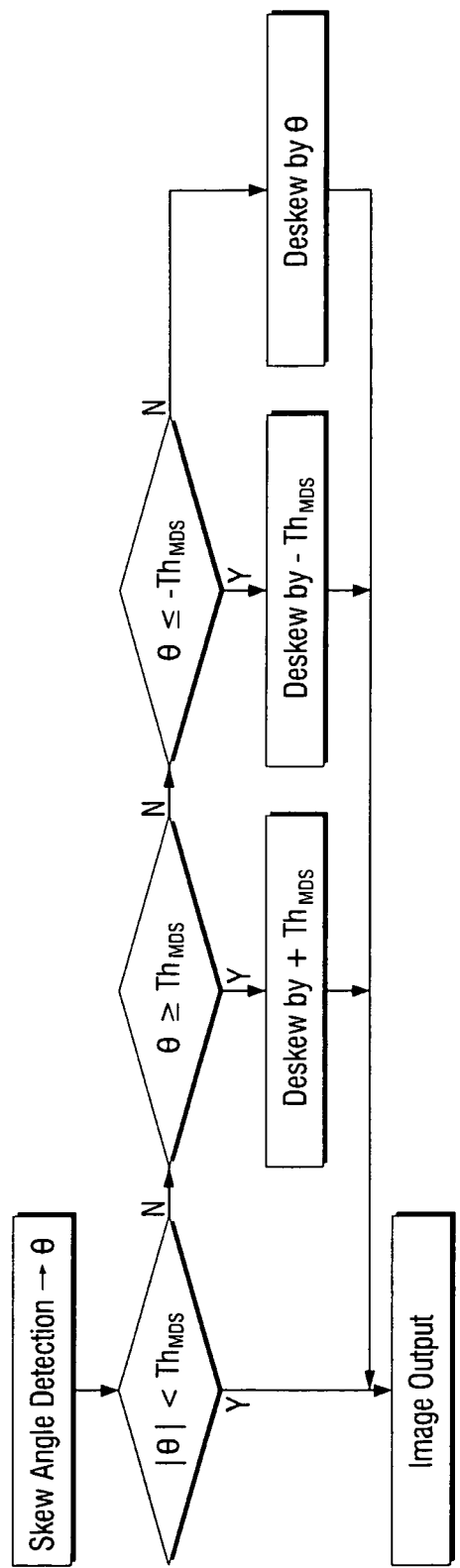
FIG. 7 is a view explaining determination of whether to perform a deskew process, and de-skew processes performed according to skew levels according to an exemplary embodiment.

FIG. 7 is a view explaining determination of whether to perform the de-skew process, and de-skew processes performed according to skew levels.

Referring to FIG. 7, whether an absolute value of the skew angle θ is less than first threshold $TH_{JDS}$ is determined by comparison between first threshold $TH_{JDS}$ and the skew angle θ. If a print medium is skewed either to the left or the right, but barely skewed, the output unit 150 may output the read image without de-skewing the image.

Additionally, if the skew angle θ is greater than an absolute value of second threshold $TH_{MDS}$, namely the maximum threshold, the compensation unit 140 may compensate for the skew using the maximum threshold.

In more detail, when the absolute value of the skew angle θ is greater than or equal to first threshold $TH_{JDS}$ and greater than the absolute value of second threshold $TH_{MDS}$, if the skew is excessively performed, it may take too much time to perform the de-skew process due to memory limitation, or data loss may occur due to an excess of allowable limit. Therefore, in this situation, the compensation unit 140 may compensate for the skew using the second threshold $TH_{MDS}$, namely the maximum threshold.

Likewise, if the absolute value of the skew angle θ is greater than or equal to first threshold $TH_{JDS}$, but less than second threshold-$TH_{MDS}$, the compensation unit 140 may compensate for the skew using second threshold-$TH_{MDS}$.

Additionally, if the skew angle θ is greater than or equal to first threshold $TH_{JDS}$, but less than or equal to second threshold $TH_{MDS}$ and not less than second threshold-$TH_{MDS}$, the compensation unit 140 may compensate for the skew using the skew angle θ.

Therefore, it is possible for a user to select whether to de-skew the image and the skew level according to the skew amount, thereby promoting user convenience.

Figure 8:
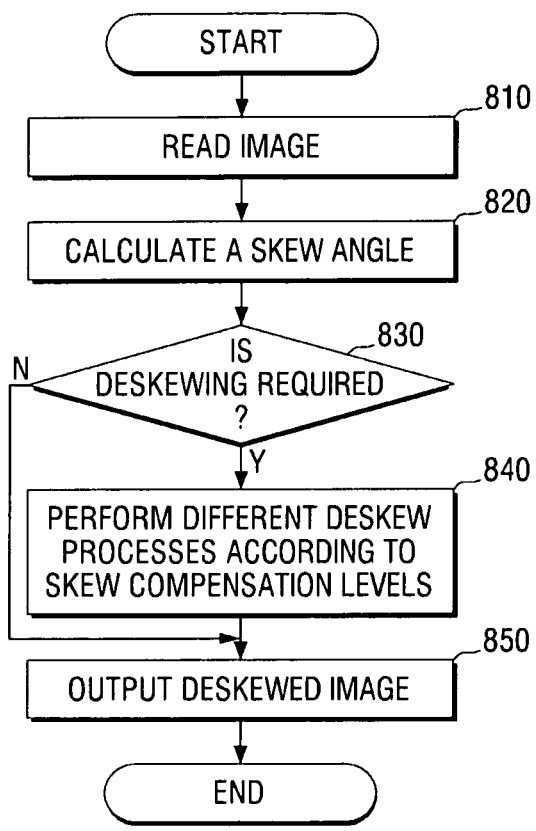
FIG. 8 is a flowchart illustrating a de-skew method of an image forming apparatus according to an exemplary embodiment.

FIG. 8 is a flowchart illustrating a de-skew method of an image forming apparatus according to an exemplary embodiment. Referring to FIG. 8, an image on a print medium fed through the ADF is read by the read unit 110 in operation 810.

The leading edge of the print medium is detected and a skew angle of the read image is calculated by the calculation unit 120 in operation 820.

Subsequently, the calculated skew angle is compared to the first threshold, and whether to perform the de-skew process is determined by the determination unit 130 in operation 830.

If it is determined that the de-skew process is required in operation 830-Y, skew compensation levels are set based on calculated skew angles and different de-skew processes are performed according to the set skew compensation levels by the compensation unit 140 in operation 840.

After the de-skewing is completed, a de-skewed image is output by the output unit 150 in operation 850.

Alternatively, if it is determined by the determination unit 130 that the de-skew process is not required in operation 830-N, because the calculated skew angle is less than the first threshold, the read image is output by the output unit 150 without being de-skewed in operation 850.

During operation 820, pixels arranged in the same array column at preset intervals are sampled individually, and a plurality of transition points are detected using the sampled pixels. Additionally, an outlier is removed from among the plurality of detected transition points, and the linear regression on the transition points remaining after removal of the outlier, so that the skew angle of the read image may be calculated according to the linear regression.

According to the de-skew method of the image forming apparatus, during operation 840, if the absolute value of the calculated skew angle exceeds the second threshold, the second threshold may be used to compensate for the skew. Additionally, if the absolute value of the calculated skew angle is an intermediate value between the first threshold and the second threshold, the intermediate value may be used to compensate for the skew.

In a de-skew method of an image forming apparatus according to another exemplary embodiment, operation 840 may be combined with operation 850.

In more detail, after determining whether to perform the de-skew process in operation 830, if the absolute value of the calculated skew angle is less than the first threshold, the image is output without being de-skewed. If the absolute value of the calculated skew angle is greater than or equal to the first threshold, skew compensation levels are set based on calculated skew angles, and different de-skew processes are performed according to the set skew compensation levels, so that a de-skewed image is output in operation 850.

In operation 850, if the absolute value of the calculated skew angle exceeds the second threshold, the second threshold may be used to compensate for the skew. Alternatively, if the absolute value of the calculated skew angle is an intermediate value between the first threshold and the second threshold, the intermediate value may be used to compensate for the skew. After the de-skewing is completed, a de-skewed image may be output.

Hereinafter, overlapping description is omitted for convenience of description.

The de-skew method of the image forming apparatus according to aspects of the present embodiments may be implemented using a single processor or chip to perform each operation.

Aspects of the present embodiments can also be embodied as a computer-readable recording medium including a program to perform the de-skew method of the image forming apparatus according to the aspects of the present embodiments described above. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that a computer-readable code is stored and executed in a distributed fashion.

Although a few embodiments have been shown and described, it would be appreciated by those skilled in the art that changes may be made in this embodiment without departing from the principles and spirit of the invention, the scope of which is defined in the claims and their equivalents.

What is claimed is:

1. A de-skew method of an image forming apparatus, the de-skew method comprising:
   reading an image on a print medium fed through an automatic document feeder (ADF);
   detecting a leading edge of the print medium and calculating a skew angle of the read image, the leading edge representing a region between a blank space outside the print medium and edges of the print medium;
   comparing the calculated skew angle to a first threshold; and
   setting skew compensation levels based on the calculated skew angle and performing different de-skew operations according to the set skew compensation levels to output a de-skewed image when an absolute value of the calculated skew angle is equal to or greater than the first threshold,
   wherein the de-skew method further comprises outputting the image without performing the de-skew operation when the absolute value of the calculated skew angle is less than the first threshold, and
   wherein the outputting of the de-skewed image comprises de-skewing the image using a second threshold to output a de-skewed image when the absolute value of the calculated skew angle exceeds the second threshold, and de-skewing the image using an intermediate value between the first threshold and the second threshold to output a de-skewed image when the absolute value of the calculated skew angle is the intermediate value.

2. The de-skew method according to claim 1, wherein the calculating of the skew angle comprises:
   individually sampling pixels arranged in a same array column at preset intervals;
   detecting a plurality of transition points using the sampled pixels;
   removing an outlier from among the plurality of detected transition points;
   performing a linear regression on the transition points remaining after removal of the outlier; and
   calculating the skew angle of the read image according to the linear regression.

3. The de-skew method according to claim 2, wherein the detecting of the plurality of transition points comprises:
   checking whether a difference in brightness between neighboring pixels in a same array column among the sampled pixels is equal to or greater than a first reference value; and
   detecting one of the neighboring pixels as a transition point when the difference in brightness between the neighboring pixels is equal to or greater than the first reference value.

4. The de-skew method according to claim 2, wherein the calculating of the skew angle further comprises:
   storing the plurality of detected transition points.

5. The de-skew method according to claim 2, wherein the removing of the outlier comprises extracting a transition point in which a row interval between neighboring pixels is equal to or greater than a second reference value from the plurality of detected transition points.

6. The de-skew method according to claim 1, further comprising: removing a top skip using the calculated skew angle.

7. The de-skew method according to claim 1, further comprising: receiving an input of a user command to set the first threshold.

8. An image forming apparatus, comprising:
   a read unit to read an image on a print medium fed through an automatic document feeder (ADF);
   a calculation unit to detect a leading edge of the print medium indicating a region between a blank space outside the print medium and edges of the print medium and to calculate a skew angle of the read image;
   a determination unit to compare the calculated skew angle to a first threshold and to determine whether to perform a deskew operation; and
   an output unit to set skew compensation levels based on the calculated skew angle and to perform different de-skew operations according to the set skew compensation levels to output a de-skewed image when an absolute value of the calculated skew angle is equal to or greater than the first threshold,
   wherein the output unit outputs the image without performing the de-skew operation when the absolute value of the calculated skew angle is less than the first threshold, and
   wherein the output unit de-skews the image using a second threshold to output a de-skewed image when an absolute value of the calculated skew angle exceeds the second threshold, and the output unit de-skews the image using an intermediate value between the first threshold and the second threshold to output a de-skewed image when the absolute value of the calculated skew angle is the intermediate value.

9. The image forming apparatus according to claim 8, wherein the calculation unit comprises:
   a sampling unit to individually sample pixels arranged in a same array column at preset intervals;
   a detection unit to detect a plurality of transition points using the sampled pixels;
   a removal unit to remove an outlier from among the plurality of detected transition points;
   a linear regression unit to perform a linear regression on the transition points remaining after removal of the outlier; and
   a skew angle calculation unit to calculate the skew angle of the read image according to the linear regression.

10. The image forming apparatus according to claim 9, wherein the detection unit checks whether a difference in brightness between neighboring pixels in a same array column among the sampled pixels is equal to or greater than a first reference value, and detects one of the neighboring pixels as a transition point when the difference in brightness between the neighboring pixels is equal to or greater than the first reference value.

11. The image forming apparatus according to claim 9, wherein the calculation unit further comprises:
   a storage unit to store the plurality of detected transition points.

12. The image forming apparatus according to claim 9, wherein the removal unit extracts a transition point in which a row interval between neighboring pixels is equal to or greater than a second reference value from the plurality of detected transition points.

13. The image forming apparatus according to claim 8, wherein the output unit removes a top skip using the calculated skew angle, and outputs an image from which the top skip is removed.

14. The image forming apparatus according to claim 8, further comprising:
   a user interface (UI) to receive an input of a user command to set the first threshold.

\* \* \* \* \*